United States Patent
Morishita

(10) Patent No.: US 10,906,142 B2
(45) Date of Patent: Feb. 2, 2021

(54) STACKING APPARATUS FOR HEAT EXCHANGER CORES

(71) Applicant: HIDAKA SEIKI KABUSHIKI KAISHA, Tokyo (JP)

(72) Inventor: Keiichi Morishita, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 16/329,983

(22) PCT Filed: Nov. 18, 2016

(86) PCT No.: PCT/JP2016/084335
§ 371 (c)(1),
(2) Date: Mar. 1, 2019

(87) PCT Pub. No.: WO2018/092279
PCT Pub. Date: May 24, 2018

(65) Prior Publication Data
US 2019/0193214 A1 Jun. 27, 2019

(51) Int. Cl.
*B23P 15/26* (2006.01)
*B23P 21/00* (2006.01)
(Continued)

(52) U.S. Cl.
CPC ............... *B23P 15/26* (2013.01); *B23P 19/04* (2013.01); *B23P 21/00* (2013.01); *F28F 9/26* (2013.01)

(58) Field of Classification Search
CPC . B23P 15/26; B23P 19/04; B23P 21/00; F28F 9/26
See application file for complete search history.

(56) References Cited

U.S. PATENT DOCUMENTS 4,486,933 A * 12/1984 Iwase .................. B21D 53/085
228/5.1
5,966,808 A * 10/1999 Maybee .............. B21D 53/085
29/727
(Continued)

FOREIGN PATENT DOCUMENTS

JP         10-263952 A      10/1998
JP       2000-176754 A       6/2000
(Continued)

OTHER PUBLICATIONS

International Search Report, issued in PCT/JP2016/084335, dated Feb. 21, 2017.

*Primary Examiner* — Christopher M Koehler
*Assistant Examiner* — Kyle A Cook
(74) *Attorney, Agent, or Firm* — Birch, Stewart, Kolasch & Birch, LLP

(57) ABSTRACT

Provided is a stacking apparatus for heat exchanger cores that can assemble heat exchanger cores manufactured by a conventional manufacturing apparatus for heat exchanger core into stacked heat exchanger cores. As a solution, the stacking apparatus for heat exchanger cores includes: a core uprightly supporting unit; a first core holder with a J shape that holds a first heat exchanger core in close contact with a second heat exchanger core, a second core holder that holds the first heat exchanger core and the second heat exchanger core in close contact, and a core holding unit that moves the first core holder and the second core holder; a core conveying unit including a bottom supporter, a third core holder with a J shape that holds the first heat exchanger core or the second heat exchanger core held by the bottom supporter in close contact, and a moving mechanism; and an operation control unit that controls an operation of the core holding unit and the core conveying unit.

11 Claims, 14 Drawing Sheets

(51) Int. Cl.
  *B23P 19/04* (2006.01)
  *F28F 9/26* (2006.01)

(56) References Cited

U.S. PATENT DOCUMENTS

| | | |
|---|---|---|
| 6,332,266 B1 | 12/2001 | Park et al. |
| 2002/0088119 A1 | 7/2002 | Chikuma et al. |
| 2006/0090331 A1 | 5/2006 | Chikuma |
| 2006/0182562 A1* | 8/2006 | Milliman ............. B21D 53/085 414/416.08 |
| 2006/0231244 A1* | 10/2006 | Sekine .................. B23K 3/087 165/173 |
| 2013/0160516 A1* | 6/2013 | Karasawa ............ B21D 43/021 72/338 |

FOREIGN PATENT DOCUMENTS

| | | | |
|---|---|---|---|
| JP | 2002-206875 A | 7/2002 | |
| JP | 2006-123084 A | 5/2006 | |

* cited by examiner

STACKING APPARATUS FOR HEAT EXCHANGER CORES

TECHNICAL FIELD

The present invention relates to a stacking apparatus for heat exchanger cores that is used for stacking a plurality of heat exchanger cores.

BACKGROUND ART

Heat exchanger cores include a plurality of heat exchanger fins, heat exchanger tubes inserted into the heat exchanger fins, and reinforcement members appropriately reinforcing the heat exchanger cores. In recent years, improved heat exchanger cores have been adopted which have enhanced heat conversion efficiency exerted by stacking a plurality of afore-mentioned heat exchanger cores.

One known example of an apparatus for manufacturing heat exchanger cores by stacking the heat exchanger cores is an apparatus with a structure as disclosed in PTL 1.

CITATION LIST

Patent Literature

PTL 1: Japanese Patent Application Laid-open No. 2006-123084

SUMMARY OF INVENTION

Technical Problem

In a manufacturing apparatus for heat exchanger cores disclosed in PTL 1, a first heat exchanger core and a second heat exchanger core are juxtaposed with each other, and integrally, temporarily assembled. First of all, in each of the first heat exchanger core and the second heat exchanger core, heat exchanger tubes are inserted into heat exchanger fins and therefore, it is necessary to replace the existing manufacturing apparatus for heat exchanger fins. Thus, there is a problem in that the existing manufacturing apparatus cannot be used effectively.

The present invention has been made in view of the above problem, and an object is to provide a stacking apparatus for heat exchanger cores that can assemble heat exchanger cores manufactured by a conventional manufacturing apparatus for heat exchanger core into stacked heat exchanger cores.

Solution to Problem

The present invention provides a stacking apparatus for heat exchanger cores, including: a core uprightly supporting unit that can uprightly support a first heat exchanger core and a second heat exchanger core in a state that the first heat exchanger core and the second heat exchanger core are in close contact with each other; a core holding unit including a first core holder that can hold the first heat exchanger core supported uprightly by the core uprightly supporting unit in a state that the first heat exchanger core is in close contact with the second heat exchanger core, the first core holder being formed to have a J shape a shorter edge of which is a contact body to be in contact with a contact surface of the second heat exchanger core, a second core holder that can hold the first heat exchanger core and the second heat exchanger core that are supported uprightly by the core uprightly supporting unit in a state that the first heat exchanger core and the second heat exchanger core are in close contact with each other, and holder moving means that enables the first core holder and the second core holder to be brought into contact with or separated from a side surface that is orthogonal to the contact surface in a direction in which the first heat exchanger core and the second heat exchanger core stand uprightly; a core conveying unit including a bottom supporter that supports a bottom of the first heat exchanger core or the second heat exchanger core to be conveyed, a third core holder that is brought into contact with or separated from the side surface that is orthogonal to the contact surface in the direction in which the first heat exchanger core or the second heat exchanger core that is held by the bottom supporter stands uprightly, and can hold the first heat exchanger core or the second heat exchanger core that is held by the bottom supporter in the direction of bringing the first heat exchanger core and the second heat exchanger core into close contact with each other, the third core holder being formed to have a J shape a shorter edge of which is a contact body to be in contact with a front surface when the first heat exchanger core or the second heat exchanger core is conveyed to the core uprightly supporting unit, and a moving mechanism; and an operation control unit that controls an operation of the core holding unit and the core conveying unit, wherein the operation control unit performs: an operation in which the core conveying unit conveys the first heat exchanger core to the core uprightly supporting unit and the first heat exchanger core is supported uprightly by the core uprightly supporting unit; an operation in which the holder moving means causes the first core holder to approach the first heat exchanger core and the first core holder to hold the first heat exchanger core; an operation in which the core conveying unit conveys the second heat exchanger core to the core uprightly supporting unit; an operation in which the holder moving means causes the first core holder to separate from the first heat exchanger core in order to cancel a contact state of the contact body of the first core holder with the first heat exchanger core, and causes the third core holder to separate from the second heat exchanger core in order to cancel a contact state of the contact body of the third core holder with the second heat exchanger core; an operation in which the moving mechanism brings the second heat exchanger core into close contact with the first heat exchanger core; and an operation in which the holder moving means causes the second core holder to approach the first heat exchanger core and the second heat exchanger core, and the second core holder to hold the first heat exchanger core and the second heat exchanger core in a close contact state.

With the above structure, the heat exchanger cores manufactured by the conventional manufacturing apparatus for heat exchanger cores can be conveyed to the next step in the stacked state.

It is preferable that the core conveying unit conveys the first heat exchanger core or the second heat exchanger core to a position right above the core uprightly supporting unit and then retracts the bottom supporter to a direction intersecting the direction in which the first heat exchanger core or the second heat exchanger core stands uprightly, so that the first heat exchanger core or the second heat exchanger core is supported uprightly by the core uprightly supporting unit.

Thus, when the heat exchanger cores to be stacked are supported uprightly by the core uprightly supporting unit, the heat exchanger cores can be supported uprightly in a careful manner and the damage of the heat exchanger cores can be prevented.

In addition, it is preferable that the core conveying unit conveys, to the core uprightly supporting unit, the second heat exchanger core in an inclined state relative to an upright surface of the first heat exchanger core that is supported uprightly by the core uprightly supporting unit so that the bottom supporter comes to a head side in a conveying direction.

Thus, when the second heat exchanger core is conveyed to the core uprightly supporting unit by which the first heat exchanger core is supported uprightly, an interference between the first core holder that holds the first heat exchanger core and the third core holder that holds the second heat exchanger core can be prevented. Accordingly, the second heat exchanger core can be conveyed smoothly.

In addition, it is preferable that the third core holder includes a plurality of third core holders disposed in the direction in which the first heat exchanger core or the second heat exchanger core stands uprightly.

Thus, the posture of the first heat exchanger core or the second heat exchanger core that is disposed sideways can be changed so that the first heat exchanger core or the second heat exchanger core can be supported uprightly in a stable state by the upright supporting unit.

In addition, it is preferable that the core uprightly supporting unit is formed to be able to uprightly support three or more of the first heat exchanger cores or the second heat exchanger cores, and at least one of the first core holders and the second core holders is flexible to a variable holding thickness dimension.

Thus, three or more heat exchanger cores can be stacked (layered).

Advantageous Effects of Invention

With the stacking apparatus for heat exchanger cores according to the present invention, heat exchanger cores manufactured by a conventional manufacturing apparatus for heat exchanger core can be assembled into stacked heat exchanger cores.

DESCRIPTION OF EMBODIMENTS

Figure 1:
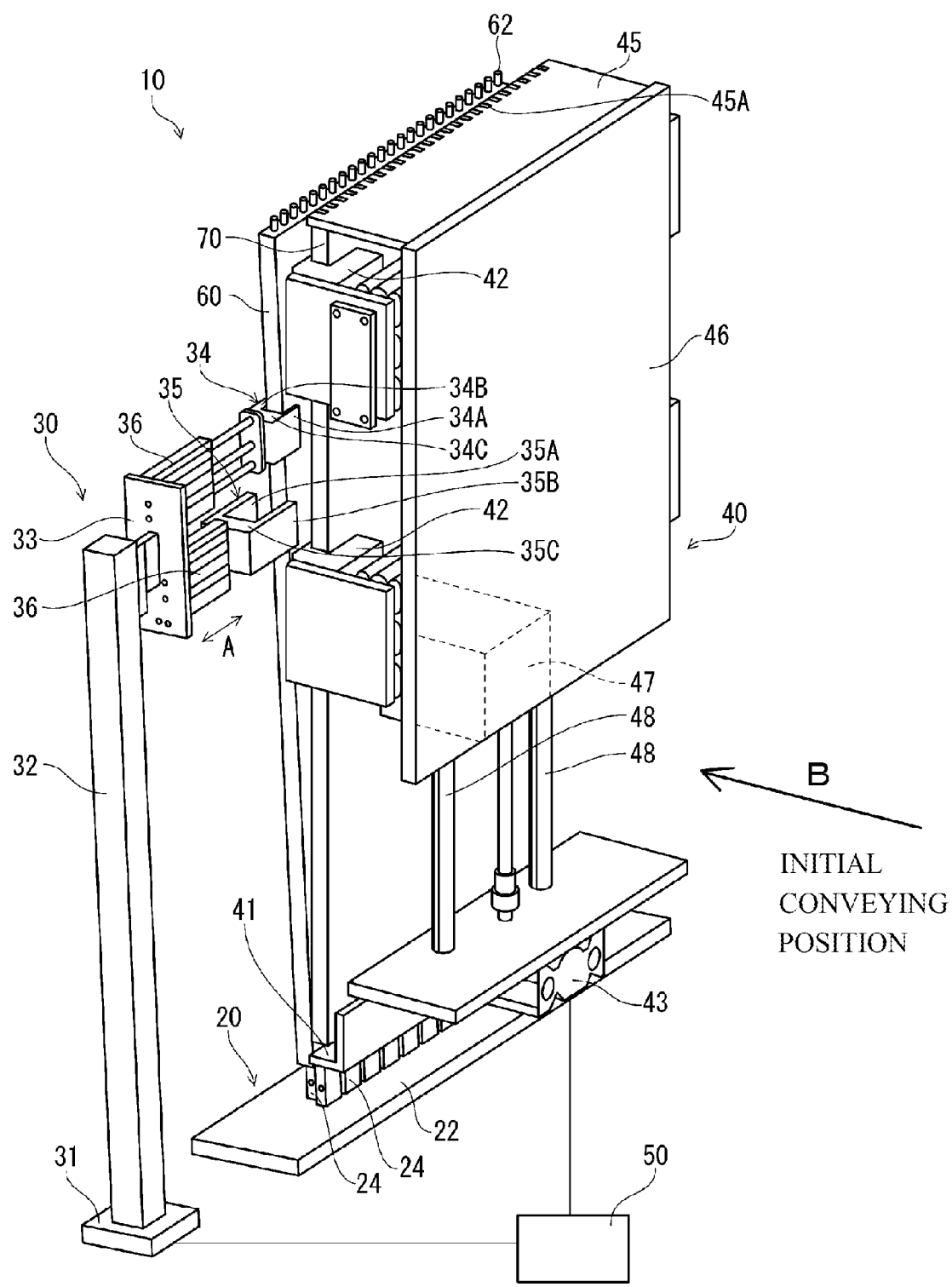
FIG. 1 is a perspective view illustrating a schematic structure of a stacking apparatus for heat exchanger cores according to the present embodiment.

A stacking apparatus for heat exchanger cores according to the present embodiment (hereinafter simply referred to as a stacking apparatus) will be described with reference to the drawings. A stacking apparatus 10 according to the present embodiment includes a core uprightly supporting unit 20, a core holding unit 30, a core conveying unit 40, and an operation control unit 50 that controls operations of the core holding unit 30 and the core conveying unit 40 as illustrated in FIG. 1. FIG. 1 illustrates a state in which the core conveying unit 40 has conveyed a second heat exchanger core 70 to the core uprightly supporting unit 20, and an initial position of the core conveying unit 40 is on a side at which an arrow B starts in FIG. 1. For the convenience of description, the illustration of a part of the structure of the stacking apparatus 10 in the present embodiment is omitted in FIG. 1.

A first heat exchanger core 60 that is stacked by the stacking apparatus 10 in the present embodiment is formed by inserting hairpin-shaped heat exchanger tubes 62 through a plurality of heat exchanger fins that are stacked in a plate thickness direction. In a manner similar to the first heat exchanger core 60, the second heat exchanger core 70 is also formed by inserting hairpin-shaped heat exchanger tubes 72 through a plurality of heat exchanger fins that are stacked in the plate thickness direction. Note that in order to simplify the illustration in the present embodiment, the heat exchanger fins that are stacked in the plate thickness direction are not illustrated in the first heat exchanger core 60 and the second heat exchanger core 70.

The core uprightly supporting unit 20 includes a base 22 and socket bodies 24 that are provided to an upper surface of the base 22. To the socket bodies 24 of the core uprightly supporting unit 20, bottom parts of the first heat exchanger core 60 and the second heat exchanger core 70 are inserted; thus, the first heat exchanger core 60 and the second heat exchanger core 70 can be uprightly supported. Here, the bottom part of the first heat exchanger core 60 to be inserted into the socket bodies 24 is a part where a U-shaped portion of the hairpin-shaped heat exchanger tube 62 is positioned. The bottom part of the second heat exchanger core 70 to be inserted into the socket bodies 24 is a part where a U-shaped portion of the hairpin-shaped heat exchanger tube 72 is positioned.

The core holding unit 30 includes a base 31, a prop 32 provided to stand on the base 31, a holder holding unit 33 provided to the prop 32, and a first core holder 34 and a second core holder 35 provided to the holder holding unit 33.

The holder holding unit 33 can move vertically along a slit (not illustrated) provided to a side surface of the prop 32 that faces the core uprightly supporting unit 20 in an upright direction of the prop 32. The holder holding unit 33 is moved vertically by holder holding unit vertically moving means that is not illustrated. An operation of the holder holding unit vertically moving means is controlled by the operation control unit 50.

The first core holder 34 is formed so as to be able to hold the first heat exchanger core 60 that is supported uprightly by the core uprightly supporting unit 20 in a direction of bringing the first heat exchanger core 60 into close contact with the second heat exchanger core 70 (hereinafter may be referred to as a thickness direction of the first heat exchanger core 60, or a thickness direction of the second heat exchanger core 70). The second core holder 35 is formed so as to be able to hold the first heat exchanger core 60 and the second heat exchanger core 70 in a direction (stacking direction) of bringing the second heat exchanger core 70 into close contact with the first heat exchanger core 60 that is supported uprightly by the core uprightly supporting unit 20.

The first core holder 34 is formed to have such a shape that the length of a contact body 34A that is in contact with a contact surface of the first heat exchanger core 60 to be in contact with the second heat exchanger core 70 is shorter than the length of a contact body 34B that is in contact with a surface opposite to the contact surface with the second heat exchanger core 70. With the contact body 34A, the contact body 34B, and a connector 34C connected to these contact body 34A and contact body 34B, the first core holder 34 is formed to have an approximately J shape in a plan view. The connector 34C is preferably formed to be expandable so as to change the distance between the contact body 34A and the contact body 34B (holding thickness dimension). Such a structure of the connector 34C is convenient in that it is flexible to a variable dimension in the thickness direction of the first heat exchanger core 60 to be held (or a case in which the first heat exchanger core 60 to be held is a plurality of heat exchanger cores).

The second core holder 35 is formed to have a U shape in plan view and includes a contact body 35A to be in contact with the first heat exchanger core 60 of the first heat exchanger core 60 and the second heat exchanger core 70 that are in close contact (stacked), a contact body 35B to be in contact with the second heat exchanger core 70, and a connector 35C connecting between the contact body 35A and the contact body 35B. The connector 35C is preferably formed to be expandable so as to change the distance between the contact body 35A and the contact body 35B (holding thickness dimension). Such a structure of the connector 35C is convenient in that it is flexible to a variable dimension in the thickness direction of the first heat exchanger core 60 and the second heat exchanger core 70 to be held (or a case in which at least one of the first heat exchanger core 60 and the second heat exchanger core 70 to be held is a plurality of heat exchanger cores).

The first core holder 34 and the second core holder 35 are provided to the holder holding unit 33 through holder moving means 36. The holder moving means 36 enables the first core holder 34 and the second core holder 35 to be brought into contact with or separated from, in a direction of an arrow A in FIG. 1, a side surface that is orthogonal to the contact surfaces of the both in the direction in which the first heat exchanger core 60 and the second heat exchanger core 70 stand uprightly. Thus, a contact state between the first heat exchanger core 60 and the contact body 34A that is a shorter edge can be canceled while the contact body 34B that is a longer edge is left in contact with the first heat exchanger core 60. As the holder moving means 36 as above, a fluid cylinder typified by a hydraulic cylinder can be used. The operation of the holder moving means 36 is controlled by the operation control unit 50.

Figure 2:
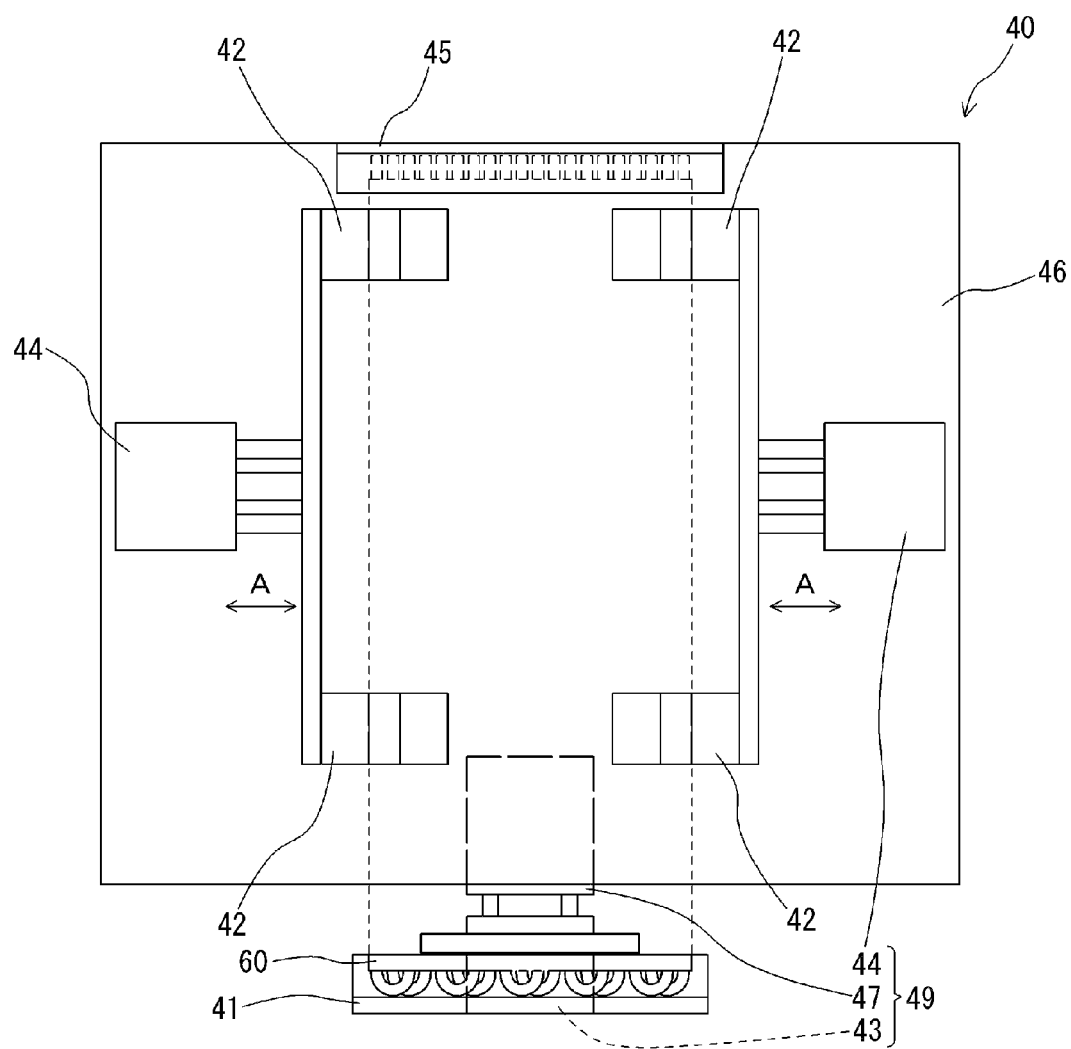
FIG. 2 is a front view illustrating a schematic structure of a core conveying unit in FIG. 1.
Figure 3:
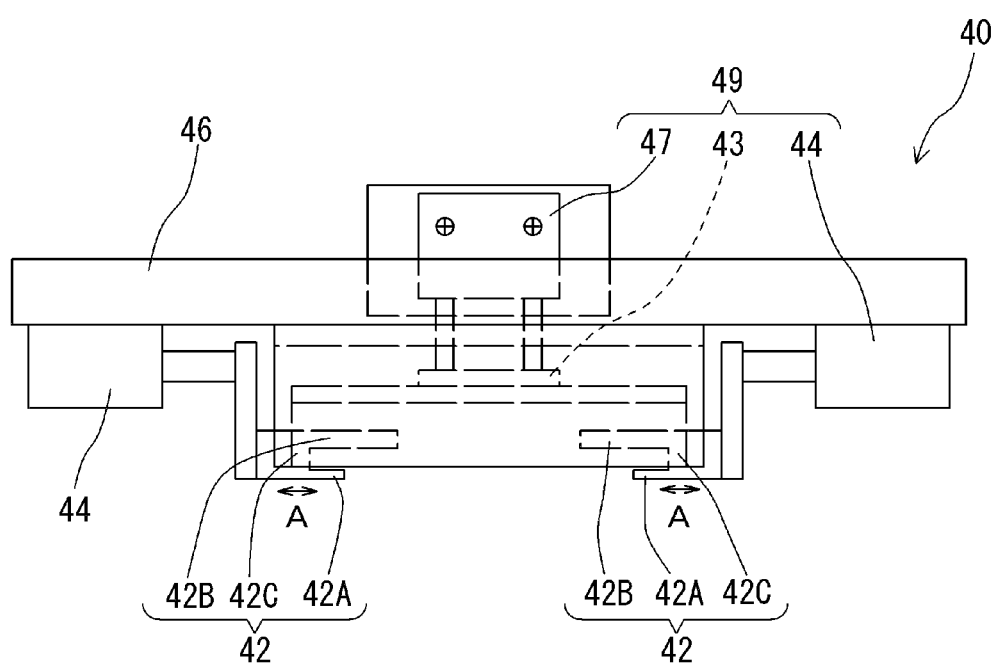
FIG. 3 is a plan view illustrating the schematic structure of the core conveying unit in FIG. 1.

The core conveying unit 40 includes at least a bottom supporter 41, a third core holder 42, and reciprocating means (not illustrated) that reciprocates the core conveying unit 40 between a place where the first heat exchanger core 60 or the second heat exchanger core 70 is disposed and the core uprightly supporting unit 20. As illustrated in FIG. 1 to FIG. 3, the core conveying unit 40 may include first contacting/separating means 43 and second contacting/separating means 44. The first contacting/separating means 43 enables the bottom supporter 41 to be brought into contact with a bottom position of the first heat exchanger core 60 or the second heat exchanger core 70 that is supported by the bottom supporter 41 or separated from the bottom position. The second contacting/separating means 44 moves the third core holder 42 to the direction of the arrow A in the drawings. Furthermore, the core conveying unit 40 may further include a pressing plate 45 that prevents the heat exchanger fins from being removed from the hairpin-shaped heat exchanger tube 62 or 72 of the first heat exchanger core 60 or the second heat exchanger core 70 during the conveyance.

The bottom supporter 41 is formed to have an L shape in a plan view, and supports the bottom part of the first heat exchanger core 60 or the bottom part of the second heat exchanger core 70 as the conveying target. The bottom supporter 41 can retract from the position of supporting the first heat exchanger core 60 or the position of supporting the second heat exchanger core 70 to a direction orthogonal to a contact surface of the first heat exchanger core 60 or the second heat exchanger core 70. The bottom supporter 41 retracts from the bottom supporting position of the first heat exchanger core 60 or the bottom supporting position of the second heat exchanger core 70 by using the first contacting/separating means 43 as a driving source. Note that the operation of the first contacting/separating means 43 is controlled by the operation control unit 50.

The third core holder 42 is formed to have such a shape that the length of a contact body 42A that is in contact with a surface of the first heat exchanger core 60 or the second heat exchanger core 70 as a conveying target that comes to the front side in a forward direction at the conveying time (arrow B in FIG. 1) is shorter than the length of a contact body 42B that is in contact with a surface thereof that comes to the rear side in the forward direction at the conveying time (arrow B in FIG. 1). With the contact body 42A, the contact body 42B, and a connector 42C connected to these contact body 42A and contact body 42B, the third core holder 42 is formed to have a J shape in a plan view. The connector 42C of the third core holder 42 is preferably formed to be expandable in accordance with the thickness dimension of the first heat exchanger core 60 and the second heat exchanger core 70 to be held. This is convenient in that it is flexible to a variable holding thickness dimension of the first heat exchanger core 60 and the second heat exchanger core 70 to be held by the third core holder 42. It is preferable that the third core holders 42 are disposed at predetermined intervals in a direction in which the first heat exchanger core 60 and the second heat exchanger core 70 stand uprightly as illustrated in FIG. 1.

The reciprocating means (not illustrated) that reciprocates the core conveying unit 40 in the horizontal direction may employ a known structure and the detailed description is therefore omitted here.

The second contacting/separating means 44 causes the third core holders 42 to be brought into contact with or separated from each other with respect to the surfaces that are orthogonal to the contact surfaces in the direction in which the first heat exchanger core 60 and the second heat exchanger core 70 stand uprightly (direction of arrow A in FIG. 1 to FIG. 3). One example of the second contacting/separating means 44 is a fluid cylinder. The pressing plate 45 that can press an upper surface of the first heat exchanger core 60 or the second heat exchanger core 70 held by the third core holders 42 is integrated with the second contacting/separating means 44 through an attachment plate 46. Vertically moving means 47 is to move the bottom supporter 41 vertically in a direction of the heat exchanger fin or a (stacking) direction of the stacking height of the heat exchanger fin in order to reduce the variation in depth of the insertion of the hairpin-shaped heat exchanger tube 62 in the heat exchanger fin or the insertion of the hairpin-shaped heat exchanger tube 72 in the heat exchanger fin. The operations of the second contacting/separating means 44, the reciprocating means, and the vertically moving means 47 are controlled by the operation control unit 50.

In the present embodiment, although not illustrated, swinging means is further provided (not illustrated). The swinging means can swing, using the bottom side of the second heat exchanger core 70 as a rotation axis, the second heat exchanger core 70 between a state in which the second heat exchanger core 70 held by the third core holder 42 is inclined relative to a contact target surface of the first heat exchanger core 60 that is supported uprightly by the core uprightly supporting unit 20 and a state in which the second heat exchanger core 70 is parallel to the contact target surface. The second heat exchanger core 70 held by the third core holder 42 is conveyed while the swinging means inclines the second heat exchanger core 70 so that the bottom supporter 41 comes to a head side in the conveying direction with respect to the upright surface of the first heat exchanger core 60 that is supported uprightly by the core uprightly supporting unit 20. The use of the swinging means as above is convenient because when the first heat exchanger core 60 and the second heat exchanger core 70 are brought into close contact (stacked), it is possible to prevent the interference between the third core holder 42 and the first core holder 34 that holds the first heat exchanger core 60 uprightly supported by the core uprightly supporting unit 20. The operation of the swinging means is also controlled by the operation control unit 50.

In the stacking apparatus 10 in the present embodiment, as described above, the first contacting/separating means 43, the second contacting/separating means 44, the reciprocating means, the vertically moving means 47, and the swinging means form a moving mechanism 49.

Subsequently, description is made of a method of bringing the first heat exchanger core 60 and the second heat exchanger core 70 into close contact (stacking the first heat exchanger core 60 and the second heat exchanger core 70) using the stacking apparatus 10 according to the present embodiment with reference to FIG. 4 to FIG. 17.

Figure 4:
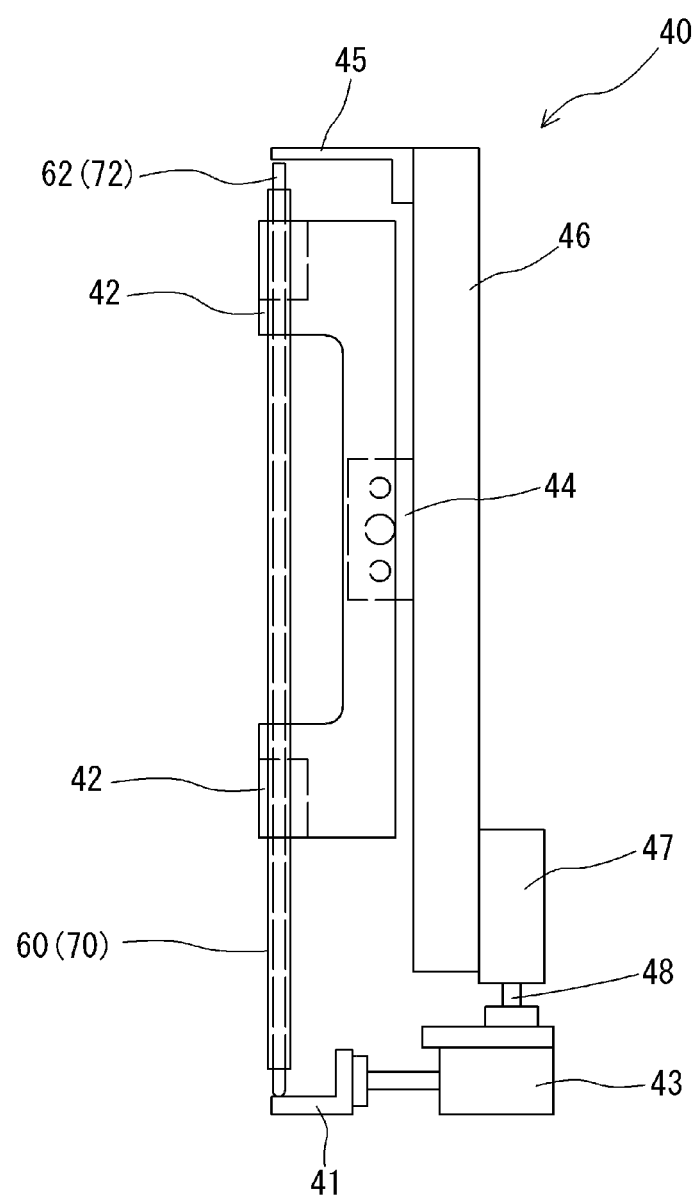
FIG. 4 is a side view (No. 1) of a main part illustrating a progress when a second heat exchanger core is stacked on a first heat exchanger core.

As illustrated in FIG. 4, when the first heat exchanger core 60 is placed on the bottom supporter 41 of the core conveying unit 40, the operation control unit 50 causes the second contacting/separating means 44 to make the third core holder 42 approach the surface that is orthogonal to the contact surface of the second heat exchanger core 70 in the direction in which the first heat exchanger core 60 stands uprightly (hereinafter the surface is also referred to as a side surface of the first heat exchanger core 60 or a side surface of the second heat exchanger core 70). Then, the third core holder 42 holds the first heat exchanger core 60 in the thickness direction.

Figure 5:
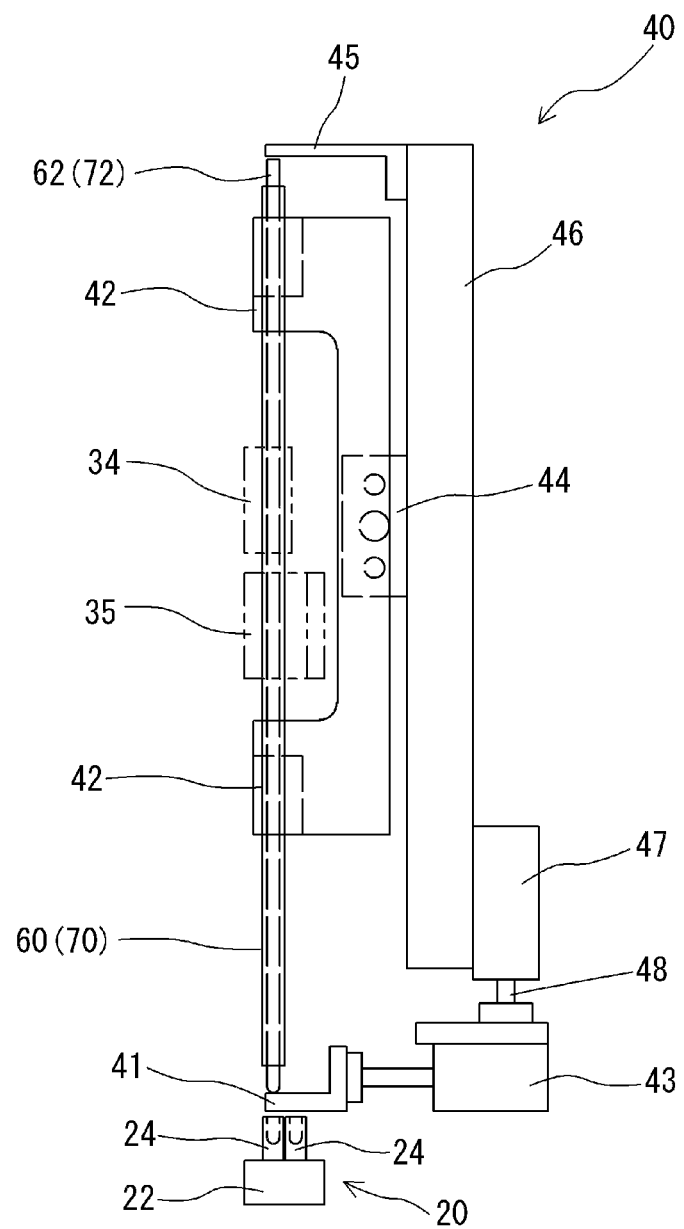
FIG. 5 is a side view (No. 2) of the main part illustrating the progress when the second heat exchanger core is stacked on the first heat exchanger core.
Figure 6:
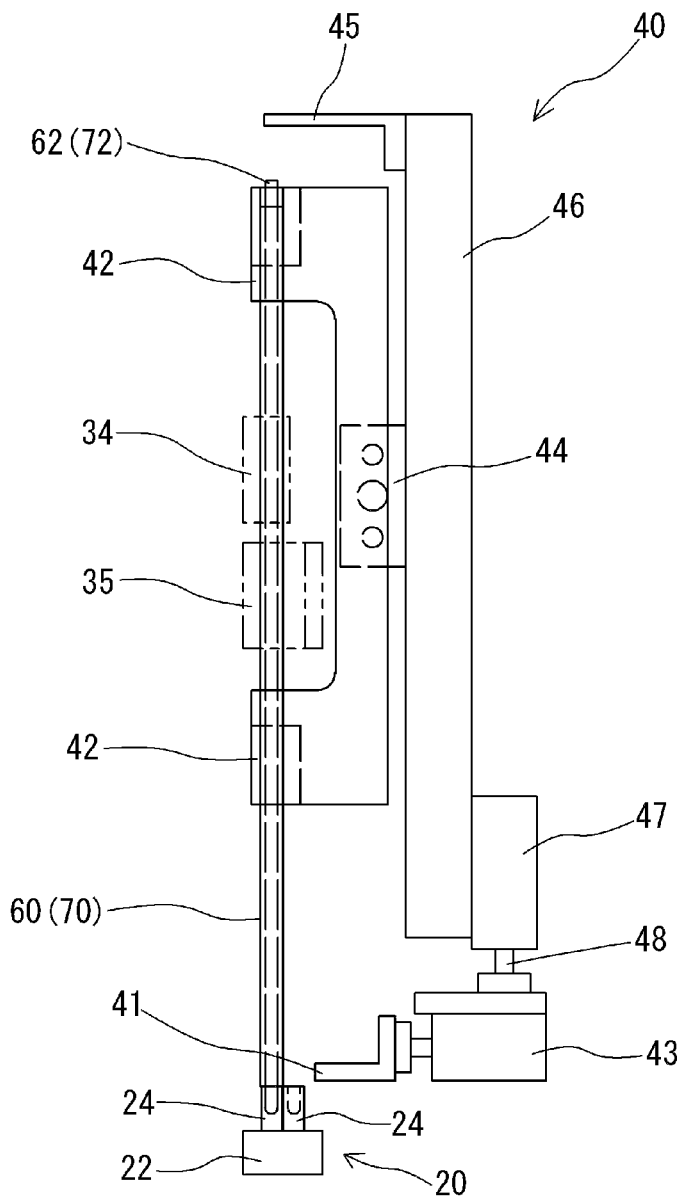
FIG. 6 is a side view (No. 3) of the main part illustrating the progress when the second heat exchanger core is stacked on the first heat exchanger core.
Figure 7:
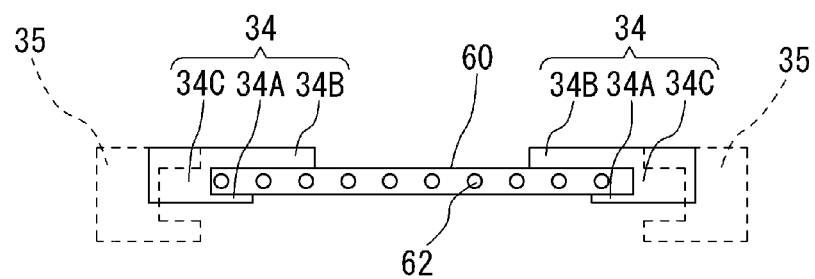
FIG. 7 is a plan view for FIG. 6.

Subsequently, the operation control unit 50 causes the reciprocating means (not illustrated) to move the core conveying unit 40 to the core uprightly supporting unit 20. As illustrated in FIG. 5, when the first heat exchanger core 60 is conveyed to the position right above the socket body 24 of the core uprightly supporting unit 20, the operation control unit 50 causes the holder moving means 36 to make the first core holder 34 of the core holding unit 30 approach the side surface of the first heat exchanger core 60 so that the first core holder 34 holds the first heat exchanger core 60 in the thickness direction. At the same time or after that, the operation control unit 50 causes the first contacting/separating means 43 to slide the bottom supporter 41 in a direction opposite to the conveying direction and insert the first heat exchanger core 60 into the socket bodies 24 by its own weight as illustrated in FIG. 6 and FIG. 7.

If necessary, the operation control unit 50 may cause the core conveying unit 40 to go down, so that the first heat exchanger core 60 is pressed into the socket bodies 24. The pressing plate 45 is provided with hairpin-shaped heat exchanger tube cuts 45A at portions corresponding to the hairpin-shaped heat exchanger tubes 62 of the first heat exchanger core 60 and the hairpin-shaped heat exchanger tubes 72 of the second heat exchanger core 70. Thus, when the pressing plate 45 and the vertically moving means 47 press the first heat exchanger core 60 or the second heat exchanger core 70 into the socket bodies 24, the hairpin-shaped heat exchanger tubes 62 and the hairpin-shaped heat exchanger tubes 72 do not interrupt.

Next, the operation control unit 50 causes the second contacting/separating means 44 to cancel the holding state of the third core holder 42. Then, the operation control unit 50 causes the first contacting/separating means 43 to restore the position of the bottom supporter 41 to the initial position, and restore the core conveying unit 40 to the initial conveying position (see FIG. 1). Then, as illustrated in FIG. 4, when the second heat exchanger core 70 is placed on the core conveying unit 40, the operation control unit 50 causes the second contacting/separating means 44 to make the third core holder 42 approach the side surface of the second heat exchanger core 70. Then, the operation control unit 50 causes the third core holder 42 to hold the second heat exchanger core 70 in the thickness direction.

Figure 8:
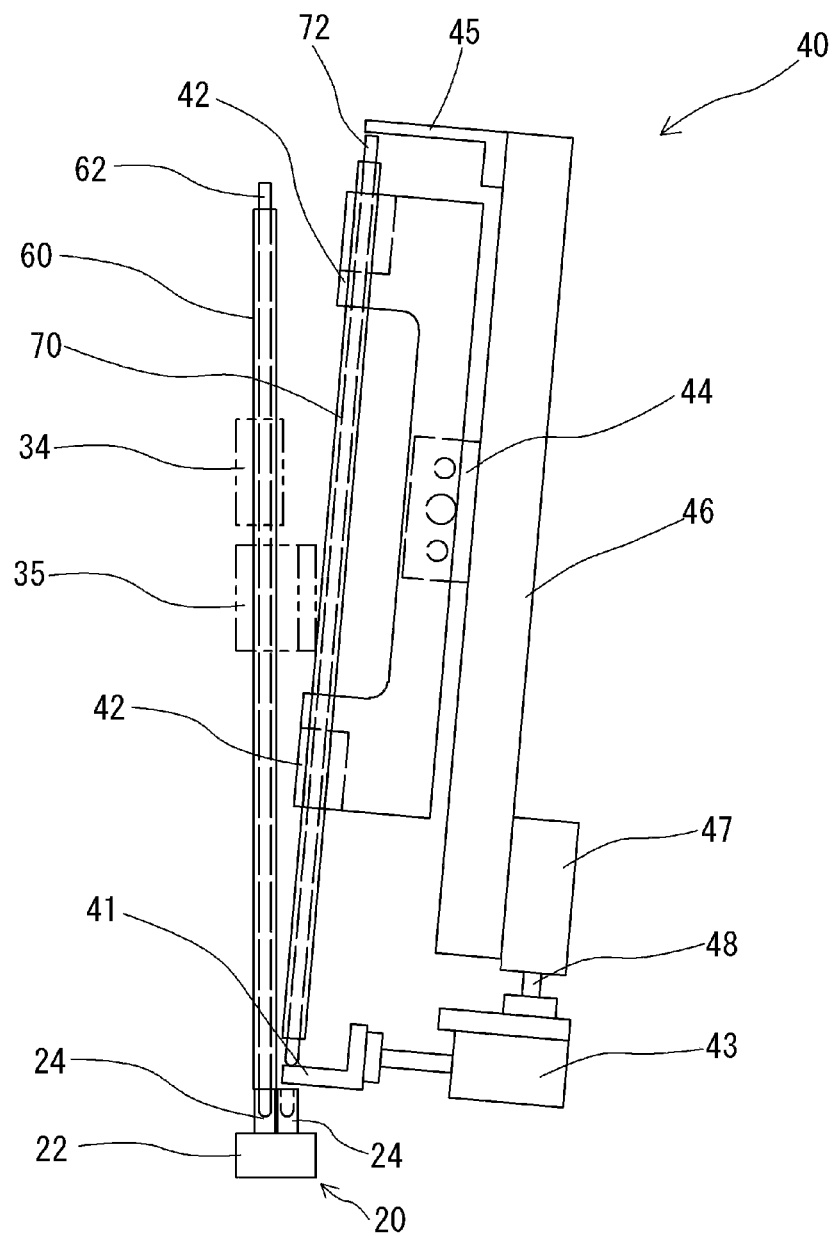
FIG. 8 is a side view (No. 4) of the main part illustrating the progress when the second heat exchanger core is stacked on the first heat exchanger core.
Figure 9:
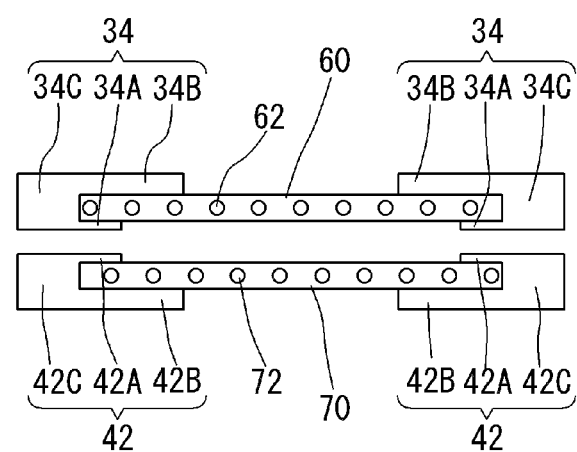
FIG. 9 is a plan view for FIG. 8.
Figure 10:
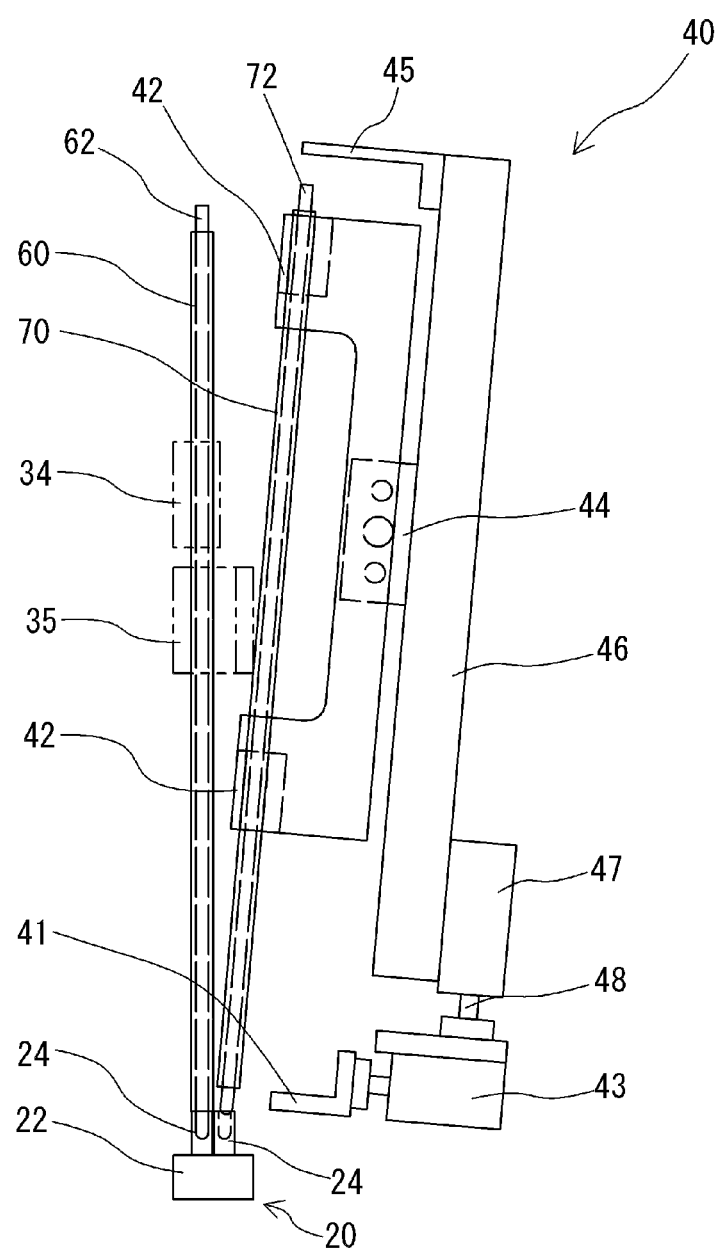
FIG. 10 is a side view (No. 5) of the main part illustrating the progress when the second heat exchanger core is stacked on the first heat exchanger core.
Figure 11:
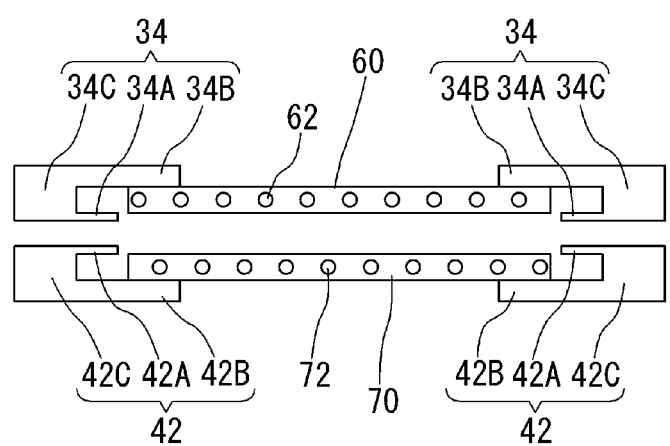
FIG. 11 is a plan view for FIG. 10.

The operation control unit 50 causes the swinging means that is not illustrated to incline the second heat exchanger core 70 so that the bottom supporter 41 side of the second heat exchanger core 70 comes to the front side in the forward direction at the conveying time and then (or at the same time), causes the reciprocating means to move the core conveying unit 40 (second heat exchanger 70) to the core uprightly supporting unit 20 as illustrated in FIG. 8 and FIG. 9. After the U-shaped part of the hairpin-shaped heat exchanger tube 72 of the second heat exchanger core 70 reaches the position right above the socket body 24 of the core uprightly supporting unit 20, the operation control unit 50 causes the holder moving means 36 to separate the first core holder 34 from the side surface of the first heat exchanger core 60 until the first heat exchanger core 60 and the contact body 34A that is shorter in the first core holder 34 of the core holding unit 30 are no longer in contact as illustrated in FIG. 10 and FIG. 11. In this state, the contact body 34B that is longer in the first core holder 34 is still in contact with the first heat exchanger core 60; thus, the first heat exchanger core 60 will not collapse.

At the same time or after that, the operation control unit 50 causes the second contacting/separating means 44 to separate the third core holder 42 from the side surface of the second heat exchanger core 70 until the second heat exchanger core 70 and the contact body 42A that is shorter in the third core holder 42 of the core conveying unit 40 are no longer in contact. In this state, the contact body 42B that is longer in the third core holder 42 is still in contact with the second heat exchanger core 70; thus, the second heat exchanger core 70 will not collapse.

Figure 12:
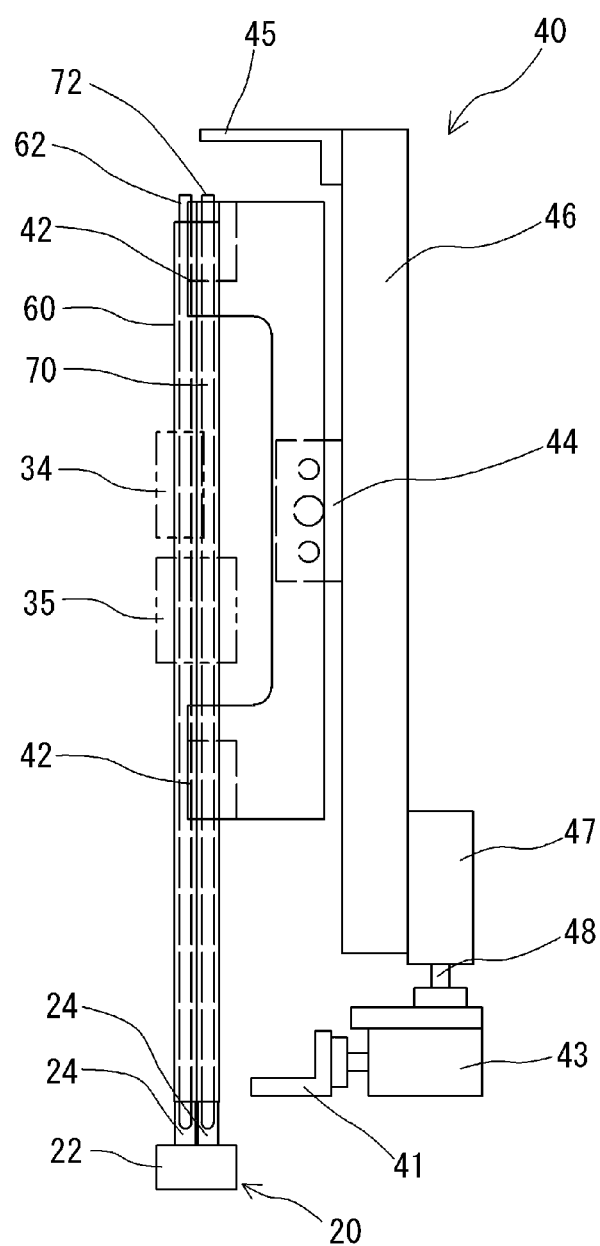
FIG. 12 is a side view (No. 6) of the main part illustrating the progress when the second heat exchanger core is stacked on the first heat exchanger core.
Figure 13:
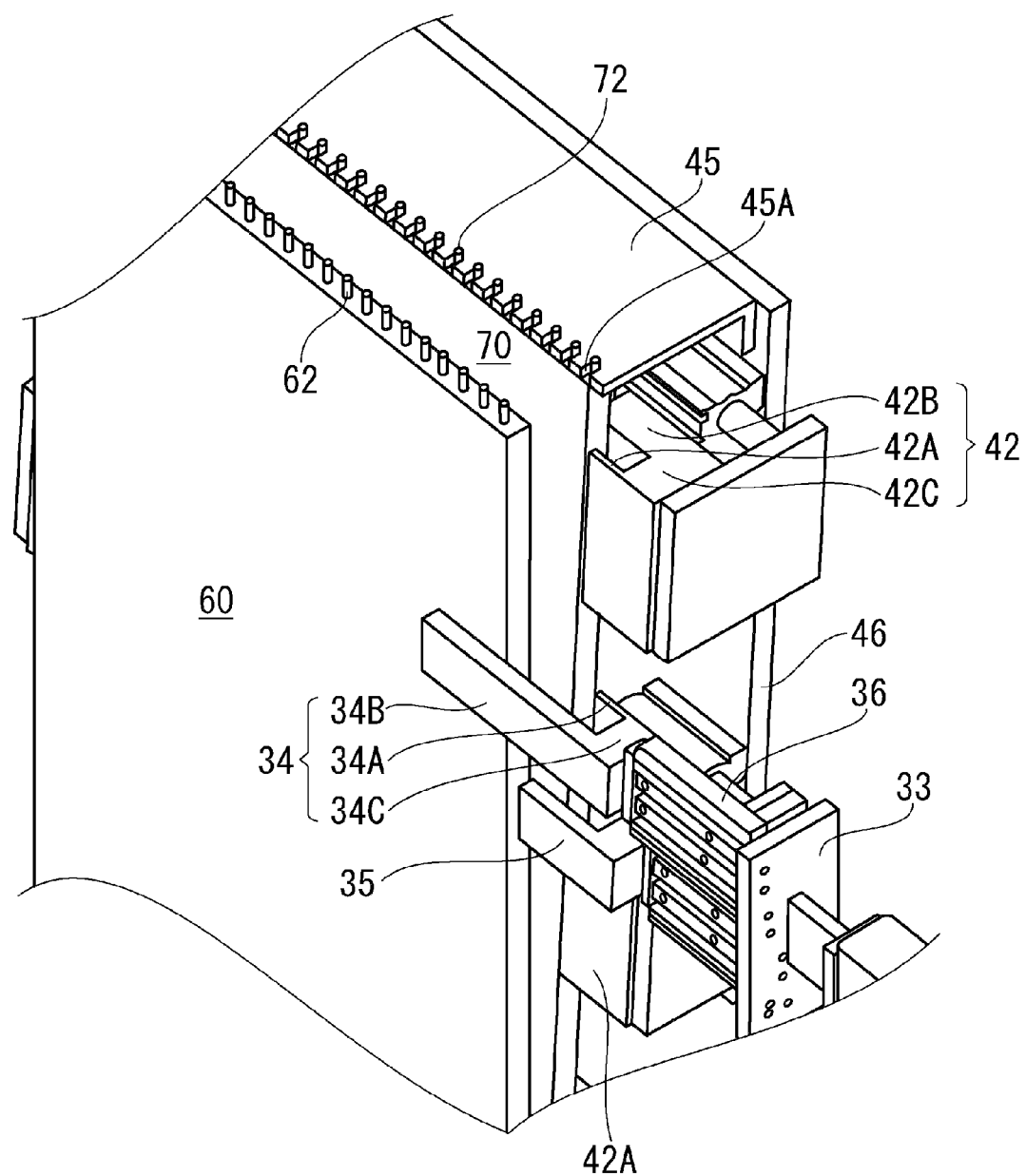
FIG. 13 is a perspective view of the main part for FIG. 12.
Figure 14:
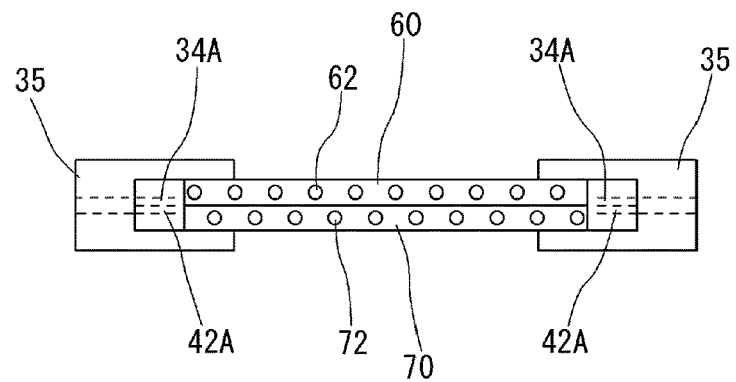
FIG. 14 is a plan view for FIG. 12.

Subsequently, as illustrated in FIG. 12 to FIG. 14, the operation control unit 50 causes the first contacting/separating means 43 to slide the bottom supporter 41 of the core conveying unit 40 in a return direction of the conveying direction of the core conveying unit 40 (direction of returning the core conveying unit 40 to the initial position), so that the second heat exchanger core 70 is inserted into the socket bodies 24 by its own weight. If necessary, the operation control unit 50 may cause the core conveying unit 40 to go down, so that the second heat exchanger core 70 is pressed into the socket bodies 24.

After that, the operation control unit 50 causes the swinging means that is not illustrated to return the inclined supporting state of the second heat exchanger core 70 to the original state (upright state in which the contact target surface of the second heat exchanger core 70 is in parallel to the contact target surface of the first heat exchanger core 60).

Figure 15:
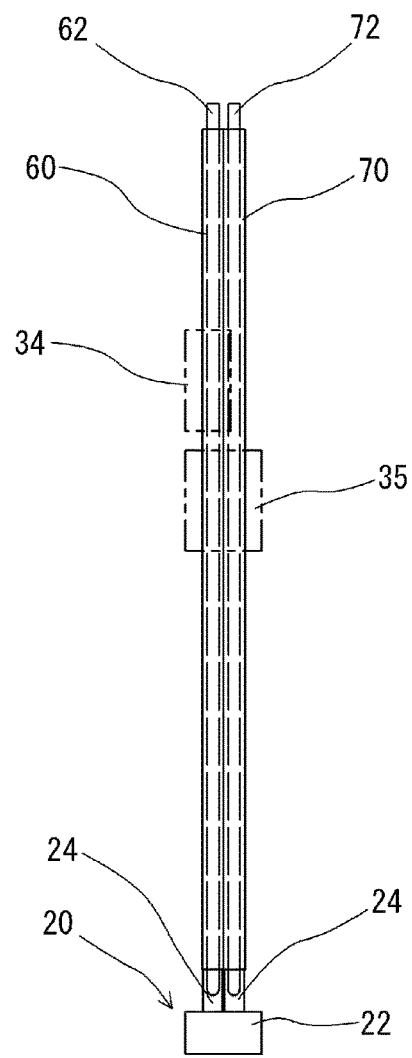
FIG. 15 is a side view (No. 7) of the main part illustrating the progress when the second heat exchanger core is stacked on the first heat exchanger core.
Figure 16:
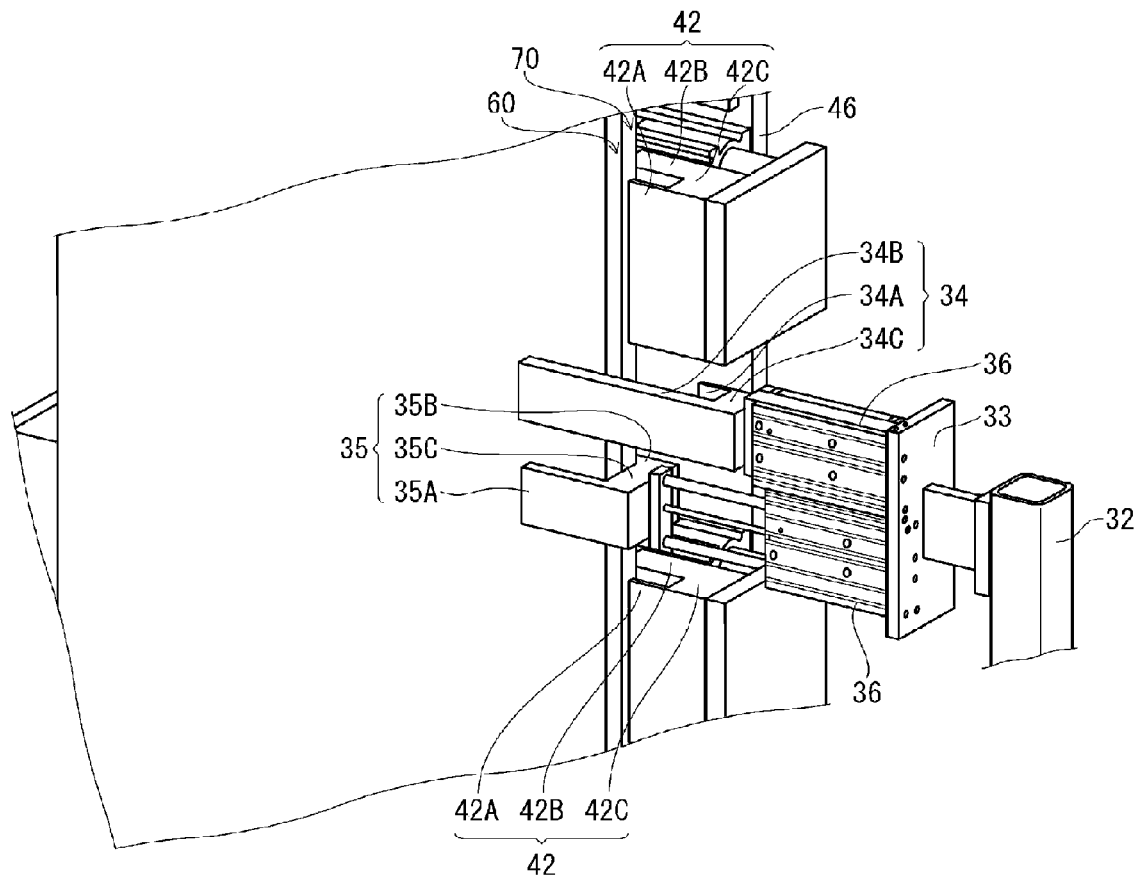
FIG. 16 is a perspective view of the main part for FIG. 15.
Figure 17:
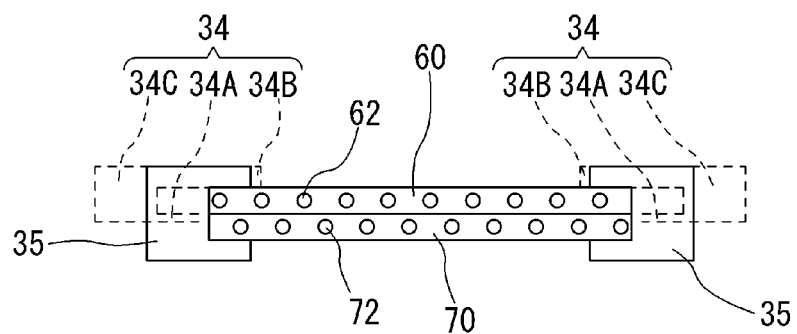
FIG. 17 is a plan view for FIG. 15.

The operation control unit 50 causes the reciprocating means that is not illustrated to bring the second heat exchanger core 70 in close contact with the first heat exchanger core 60 that is uprightly supported by the core uprightly supporting unit 20 and then, causes the holder moving means 36 to make the second core holder 35 approach the side surface of the first heat exchanger core 60 and the second heat exchanger core 70. Then, as illustrated in FIG. 15 to FIG. 17, the operation control unit 50 causes the second core holder 35 to hold the first heat exchanger core 60 and the second heat exchanger core 70 in the thickness direction.

After the second core holder 35 holds the first heat exchanger core 60 and the second heat exchanger core 70, the operation control unit 50 returns the core conveying unit 40 to the initial position, and moreover takes out the first heat exchanger core 60 and the second heat exchanger core 70 that are stacked in the close state by the second core holder 35 to the next step. When the first heat exchanger core 60 and the second heat exchanger core 70 that are stacked are taken out, a takeout unit that is not illustrated takes out the first heat exchanger core 60 and the second heat exchanger core 70 from the second core holder 35. Then, the operation control unit 50 repeats the above operation as long as the first heat exchanger core 60 or the second heat exchanger core 70 is placed on the bottom supporter 41 of the core uprightly supporting unit 20.

Description has been made of the method of stacking the first heat exchanger core 60 and the second heat exchanger core 70 using the stacking apparatus 10 according to the present embodiment; however, the technical range of the present invention is not limited to the above embodiment. For example, although each of the first heat exchanger core 60 and the second heat exchanger core 70 is one heat exchanger core in the above embodiment, at least one of the first heat exchanger core 60 and the second heat exchanger core 70 may be a plurality of heat exchanger cores. In this case, the number of socket bodies 24 in the core uprightly supporting unit 20 may be set to be able to uprightly support three or more components, and the connector 34C of the first core holder 34, the connector 35C of the second core holder 35, and the connector 42C of the third core holder 42 may be expandable.

In addition, although the first heat exchanger core 60 and the second heat exchanger core 70 are in the same mode in the above embodiment, the first heat exchanger core 60 and the second heat exchanger core 70 may be different in at least one of the mode and the size.

In the above embodiment, when the second heat exchanger core 70 is conveyed by the core conveying unit 40, the second heat exchanger core 70 is inclined relative to the first heat exchanger core 60. However, the present invention is not limited to this mode. For example, a conveying height position of the second heat exchanger core 70 may be higher than an upper end height position of the first heat exchanger core 60. In this mode, it is unnecessary to incline the second heat exchanger core 70. When the second heat exchanger core 70 is inserted into the socket bodies 24, the vertically moving means 47 gradually moves down the second heat exchanger core 70 to the height position of the bottom supporter 41 and the second contacting/separating means 44 causes the third core holder 42 to separate from the side surface of the second heat exchanger core 70. Thus, the interference between the first core holder 34 and the third core holder 42 can be avoided.

In addition, when the bottom supporter 41 is retracted from the bottom supporting position of the first heat exchanger core 60 or the bottom supporting position of the second heat exchanger core 70, the bottom supporter 41 is brought into contact or separated in the direction orthogonal to the contact surface of the first heat exchanger core 60 and the second heat exchanger 70 (conveying direction of the core conveying unit 40) in the present embodiment. However, the bottom supporter 41 may be brought into contact or separated in the direction orthogonal to the contacting/separating direction in a horizontal plane (in a direction in which the first core holder 34, the second core holder 35, and the third core holder 42 are brought into contact with or separated from the first heat exchanger core 60 and the second heat exchanger 70). It is only necessary that the supported state of the first heat exchanger core 60 or the supported state of the second heat exchanger 70 by the bottom supporter 41 is canceled by linearly moving the bottom supporter 41, so that the first heat exchanger core 60 or the second heat exchanger 70 can be inserted into the socket bodies 24.

The structure of the hairpin-shaped heat exchanger tube cuts 45A of the pressing plate 45 may be omitted.

In the above embodiment, the second core holder 35 is included in the core holding unit 30; however, the second core holder 35 may be included in the structure of the takeout unit. This structure is preferable because the tact time of transferring the first heat exchanger core 60 and the second heat exchanger core 70 that are stacked from the second core holder 35 to the conveying unit can be reduced.

The modifications described in the above embodiment may be combined as appropriate.

What is claimed is:

1. A stacking apparatus for heat exchanger cores, the stacking apparatus comprising: a core uprightly supporting unit that is able to uprightly support a first heat exchanger core and a second heat exchanger core in a state that the first heat exchanger core and the second heat exchanger core are in contact with each other; a core holding unit including:

a first core holder that is able to hold the first heat exchanger core supported uprightly by the core uprightly supporting unit in a direction of bringing the first heat exchanger core into contact with the second heat exchanger core, the first core holder being formed to have a J shape wherein a shorter edge is configured to contact a surface of the first heat exchanger core, wherein the surface of the first heat exchanger core is configured to contact the second heat exchanger core, a second core holder that is able to hold the first heat exchanger core and the second heat exchanger core that are supported uprightly by the core uprightly supporting unit for bringing the first heat exchanger core and the second heat exchanger core into contact with each other, and holder moving means that enables the first core holder and the second core holder to be brought into contact with or separated from a side surface that is orthogonal to the contact surface in a direction in which the first heat exchanger core and the second heat exchanger core stand uprightly;

a core conveying unit including:

a bottom supporter that supports a bottom of the first heat exchanger core or the second heat exchanger core to be conveyed, a third core holder that is brought into contact with or separated from the side surface that is orthogonal to the contact surface in the direction in which the first heat exchanger core or the second heat exchanger core that is held by the bottom supporter stands uprightly, and is able to hold the first heat exchanger core or the second heat exchanger core that is held by the bottom supporter in the direction of bringing the first heat exchanger core and the second heat exchanger core into close contact with each other, the third core holder being formed to have a J shape a shorter edge of which is a contact body to be in contact with a front surface when the first heat exchanger core or the second heat exchanger core is conveyed to the core uprightly supporting unit, and a moving mechanism; and an operation control unit that controls an operation of the core holding unit and the core conveying unit, wherein the operation control unit is configured to perform:

an operation in which the core conveying unit conveys the first heat exchanger core to the core uprightly supporting unit and the first heat exchanger core is supported uprightly by the core uprightly supporting unit, an operation in which the holder moving means causes the first core holder to approach the first heat exchanger core and the first core holder to hold the first heat exchanger core, an operation in which the core conveying unit conveys the second heat exchanger core to the core uprightly supporting unit, an operation in which the holder moving means causes the first core holder to separate from the first heat exchanger core in order to cancel a contact state of the shorter edge of the first core holder with the first heat exchanger core, and causes the third core holder to separate from the second heat exchanger core in order to cancel a contact state of the contact body of the third core holder with the second heat exchanger core, an operation in which the moving mechanism brings the second heat exchanger core into contact with the first heat exchanger core, and an operation in which the holder moving means causes the second core holder to approach the first heat exchanger core and the second heat exchanger core, and the second core holder to hold the first heat exchanger core and the second heat exchanger core in a stacking direction in a contact state.

2. The stacking apparatus for heat exchanger cores according to claim 1,
wherein the core uprightly supporting unit is formed to be able to uprightly support three or more of the first heat exchanger cores or the second heat exchanger cores, and
at least one of the first core holders and the second core holders is flexible to a variable holding thickness dimension.

3. The stacking apparatus for heat exchanger cores according to claim 1,
wherein the third core holder includes a plurality of third core holders disposed in the direction in which the first heat exchanger core or the second heat exchanger core stands uprightly.

4. The stacking apparatus for heat exchanger cores according to claim 3,
wherein the core uprightly supporting unit is formed to be able to uprightly support three or more of the first heat exchanger cores or the second heat exchanger cores, and
at least one of the first core holders and the second core holders is flexible to a variable holding thickness dimension.

5. The stacking apparatus for heat exchanger cores according to claim 1,
wherein the core conveying unit conveys, to the core uprightly supporting unit, the second heat exchanger core in an inclined state relative to an upright surface of the first heat exchanger core that is supported uprightly by the core uprightly supporting unit so that the bottom supporter comes to a head side in a conveying direction.

6. The stacking apparatus for heat exchanger cores according claim 5, wherein the third core holder includes a plurality of third core holders disposed in the direction in which the first heat exchanger core or the second heat exchanger core stands uprightly.

7. The stacking apparatus for heat exchanger cores according to claim 5,
wherein the core uprightly supporting unit is formed to be able to uprightly support three or more of the first heat exchanger cores or the second heat exchanger cores, and
at least one of the first core holders and the second core holders is flexible to a variable holding thickness dimension.

8. The stacking apparatus for heat exchanger cores according to claim 1,
wherein the core conveying unit conveys the first heat exchanger core or the second heat exchanger core to a position right above the core uprightly supporting unit and then retracts the bottom supporter in a direction intersecting the direction in which the first heat exchanger core or the second heat exchanger core stands uprightly, so that the first heat exchanger core or the second heat exchanger core is supported uprightly by the core uprightly supporting unit.

9. The stacking apparatus for heat exchanger cores according to claim 8, wherein the core conveying unit conveys, to the core uprightly supporting unit, the second heat exchanger core in an inclined state relative to an upright surface of the first heat exchanger core that is supported uprightly by the core uprightly supporting unit so that the bottom supporter comes to a head side in a conveying direction.

10. The stacking apparatus for heat exchanger cores according claim 8, wherein the third core holder includes a plurality of third core holders disposed in the direction in which the first heat exchanger core or the second heat exchanger core stands uprightly.

11. The stacking apparatus for heat exchanger cores according to claim 8,
   wherein the core uprightly supporting unit is formed to be able to uprightly support three or more of the first heat exchanger cores or the second heat exchanger cores, and
   at least one of the first core holders and the second core holders is flexible to a variable holding thickness dimension.

\* \* \* \* \*